US011907501B2

(12) United States Patent
Takekawa

(10) Patent No.: US 11,907,501 B2
(45) Date of Patent: Feb. 20, 2024

(54) INFORMATION PROCESSING DEVICE

(71) Applicant: Oki Electric Industry Co., Ltd., Tokyo (JP)

(72) Inventor: Akira Takekawa, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 17/838,775

(22) Filed: Jun. 13, 2022

(65) Prior Publication Data

US 2022/0308715 A1 Sep. 29, 2022

Related U.S. Application Data

(63) Continuation-in-part of application No. PCT/JP2020/040463, filed on Oct. 28, 2020.

(30) Foreign Application Priority Data

Jan. 30, 2020 (JP) .................. 2020-013955

(51) Int. Cl.
*G06F 3/0482* (2013.01)
*G06F 3/04817* (2022.01)
*G07F 19/00* (2006.01)

(52) U.S. Cl.
CPC ........ *G06F 3/0482* (2013.01); *G06F 3/04817* (2013.01); *G07F 19/206* (2013.01)

(58) Field of Classification Search
CPC .. G06F 3/0482; G06F 3/04817; G07F 19/206; G07D 1/00; G07D 11/00; G07D 11/32; G07D 11/60
See application file for complete search history.

(56) References Cited

U.S. PATENT DOCUMENTS

| 2016/0012465 | A1* | 1/2016 | Sharp ................... G06Q 20/321 |
| | | | 705/14.17 |
| 2019/0095057 | A1* | 3/2019 | Fukasawa ............ G06Q 20/047 |
| 2019/0095883 | A1* | 3/2019 | Robinson ............... G06Q 40/02 |
| 2019/0236889 | A1* | 8/2019 | Gotanda ................... G07F 9/04 |
| 2023/0030082 | A1* | 2/2023 | Fujisawa ............. G06Q 20/326 |

FOREIGN PATENT DOCUMENTS

JP 2013171303 A 9/2013

* cited by examiner

*Primary Examiner* — Cao H Nguyen
(74) *Attorney, Agent, or Firm* — Rabin & Berdo, P.C.

(57) ABSTRACT

An information processing device including: an operation display; a storage section configured to store transaction content information including a transaction content that has been previously executed and date/time information of the executed transaction content; a processor configured to, based on an operation date/time information of a user operating the operation display, search in the storage section as to whether there is a recursive transaction that has been repeatedly executed with a same transaction content in a same time band as a time band of the operation date/time information; and in a case in which there is the recursive transaction, display a first screen including a selection button for selecting the recursive transaction on the operation display, and, after the selection button is selected, automatically switch displays of plural screens showing a transaction content of the recursive transaction.

13 Claims, 10 Drawing Sheets

FIG.3

| DATE (Y/M/D) | TIME (HOURS:MIN) | ID NUMBER | REGISTER NUMBER | TRANSACTION CLASS | AMOUNT | 10,000 YEN | 5000 YEN | 1000 YEN | 500 YEN | 100 YEN | 50 YEN | 10 YEN | 5 YEN | 1 YEN |
|---|---|---|---|---|---|---|---|---|---|---|---|---|---|---|
| 2019/12/04 | 09:00 | 111111 | 2 | CHANGE RESERVE PAYOUT | 12,730 | 0 | 0 | 10 | 2 | 15 | 0 | 20 | 4 | 10 |
| 2019/12/04 | 20:30 | 222222 | 2 | SALES PAY-IN | XXXX | | | | | | | | | |
| ... | | | | | | | | | | | | | | |
| 2019/12/11 | 09:12 | 111111 | 1 | CHANGE RESERVE PAYOUT | 12,730 | 0 | 0 | 10 | 2 | 15 | 0 | 20 | 4 | 10 |
| ... | | | | | | | | | | | | | | |
| 2019/12/16 | 09:11 | 111111 | 1 | CHANGE RESERVE PAYOUT | 12,730 | 0 | 0 | 10 | 2 | 15 | 0 | 20 | 4 | 10 |
| ... | | | | | | | | | | | | | | |
| 2019/12/17 | 09:20 | 111111 | 1 | CHANGE RESERVE PAYOUT | 12,730 | 0 | 0 | 10 | 2 | 15 | 0 | 20 | 4 | 10 |
| ... | | | | | | | | | | | | | | |

CHANGE RESERVE PAYOUT

PLEASE INPUT DENOMINATION COUNTS AND PRESS "CONFIRM"

| DENOMINATION | IN-MACHINE STOCK | COUNT |
|---|---|---|
| 10,000 YEN | X SHEETS | SHEETS |
| 5,000 YEN | X SHEETS | SHEETS |
| 1000 YEN | X SHEETS | SHEETS |
| 500 YEN | X COINS | COINS |
| 100 YEN | X COINS | COINS |
| 50 YEN | X COINS | COINS |
| 10 YEN | X COINS | COINS |
| 5 YEN | X COINS | COINS |
| 1 YEN | X COINS | COINS |
| TOTAL | X YEN SUBTOTAL | YEN |

▲ — 531
▼ — 532
CONFIRM — 533

CHANGE RESERVE PAYOUT

PLEASE PRESS "CONFIRM" IF THE PAYOUT AMOUNT IS CORRECT
PLEASE PRESS "CORRECT" TO CORRECT

| DENOMINATION | IN-MACHINE STOCK | COUNT |
|---|---|---|
| 10,000 YEN | X SHEETS | 0 SHEETS |
| 5,000 YEN | X SHEETS | 0 SHEETS |
| 1000 YEN | X SHEETS | 10 SHEETS |
| 500 YEN | X COINS | 2 COINS |
| 100 YEN | X COINS | 15 COINS |
| 50 YEN | X COINS | 0 COINS |
| 10 YEN | X COINS | 20 COINS |
| 5 YEN | X COINS | 4 COINS |
| 1 YEN | X COINS | 10 COINS |
| TOTAL | X YEN SUBTOTAL | 12,730 YEN |

▲ — 542
▼ — 543
CORRECT — 541
CONFIRM — 544

FIG.8A

CHANGE RESERVE PAYOUT — 630

PLEASE INPUT DENOMINATION COUNTS AND PRESS "CONFIRM"

| DENOMINATION | IN-MACHINE STOCK | COUNT |
|---|---|---|
| 10,000 YEN | X SHEETS | 0 SHEETS |
| 5,000 YEN | X SHEETS | 0 SHEETS |
| 1000 YEN | X SHEETS | 10 SHEETS |
| 500 YEN | X COINS | 2 COINS |
| 100 YEN | X COINS | 15 COINS |
| 50 YEN | X COINS | 0 COINS |
| 10 YEN | X COINS | 20 COINS |
| 5 YEN | X COINS | 4 COINS |
| 1 YEN | X COINS | 10 COINS |
| TOTAL | X YEN | SUBTOTAL 12,730 YEN |

Buttons: STOP — 621, PAUSE — 622, SKIP — 623, ▲ — 531, ▼ — 532, CONFIRM — 533

FIG.8B

CHANGE RESERVE PAYOUT — 640

PLEASE PRESS "CONFIRM" IF THE PAYOUT AMOUNT IS CORRECT
PLEASE PRESS "AMEND" TO CORRECT

| DENOMINATION | IN-MACHINE STOCK | COUNT |
|---|---|---|
| 10,000 YEN | X SHEETS | 0 SHEETS |
| 5,000 YEN | X SHEETS | 0 SHEETS |
| 1000 YEN | X SHEETS | 10 SHEETS |
| 500 YEN | X COINS | 2 COINS |
| 100 YEN | X COINS | 15 COINS |
| 50 YEN | X COINS | 0 COINS |
| 10 YEN | X COINS | 20 COINS |
| 5 YEN | X COINS | 4 COINS |
| 1 YEN | X COINS | 10 COINS |
| TOTAL | X YEN | SUBTOTAL 12,730 YEN |

Buttons: STOP — 621, PAUSE — 622, SKIP — 623, ▲ — 542, ▼ — 543, CORRECT — 541, CONFIRM — 544

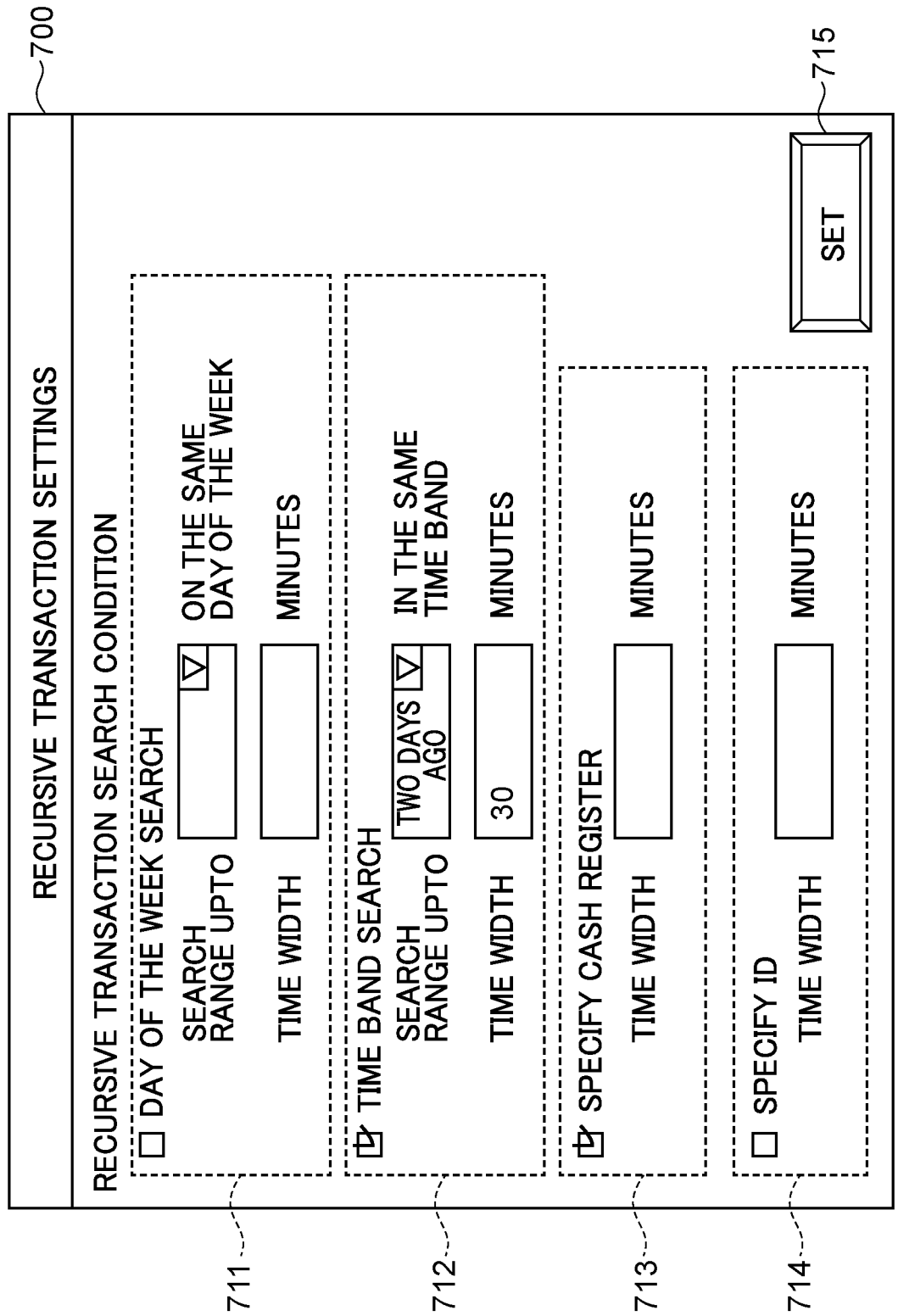

INFORMATION PROCESSING DEVICE

CROSS-REFERENCE TO RELATED APPLICATIONS

This application is a continuation-in-part application of International Application No. PCT/JP2020/040463, filed on Oct. 28, 2020, which is incorporated herein by reference in its entirety. Further, this application claims priority from Japanese Patent Application No. 2020-013955, filed on Jan. 30, 2020, the disclosure of which are incorporated by reference herein in their entirety.

BACKGROUND

Technical Field

The present disclosure relates to an information processing device.

Background Art

Cash dispensing machines for paying-out cash (banknotes and coins) employed as a change reserve fund, or for paying in store sales receipts in stores, are installed in retail stores such as department stores, supermarkets, convenience stores, or the like (see Japanese Patent Application Laid-Open (JP-A) No. 2013-171303).

In order to execute desired information processing (transaction processing) by a cash dispensing machine, an operator, such as a store manager or cashier, selects a desired transaction from a menu screen displayed on an operation display section, and the transaction starts. Thereafter, operation screens are displayed according to the transaction procedure by display on the operation display section, the operator performs successive specific inputs and selections according to each of the operation screens, and ends the processing.

When a cashier pays out a change reserve fund, the cashier selects the change reserve payout button from a menu screen, inputs denomination counts on the next operation screen, checks the denomination counts and the payout amount on the next confirmation screen, further finalizes the transaction content on the next finalization screen, and then pays out the change reserve fund in the specified denomination counts.

Similar applies not just to change reserve payout, but also when executing other transactions such as balance calculation, sales collection, sales pay-in, and the like in cash dispensing machines. There is a trend for these various types of transaction to be executed by managers, cashiers, and the like in the same time band every day.

SUMMARY

An aspect of the preset disclosure is an information processing device including: an operation display; a storage section configured to store transaction content information including a transaction content that has been previously executed and date/time information of the executed transaction content; and a processor configured to, based on an operation date/time information of a user operating the operation display, search in the storage section as to whether there is a recursive transaction that has been repeatedly executed with a same transaction content in a same time band as a time band of the operation date/time information; and in a case in which there is the recursive transaction, display a first screen including a selection button for selecting the recursive transaction on the operation display, and, after the selection button is selected, automatically switch displays of plural screens showing a transaction content of the recursive transaction.

BRIEF DESCRIPTION OF DRAWINGS

FIG. 3 is a configuration diagram illustrating a configuration of historical information including transaction and transaction content stored in the transaction processing device of the first exemplary embodiment.

FIG. 5A is a screen diagram illustrating a configuration of a denomination counts input screen and payout amount confirmation screen in the first exemplary embodiment.

FIG. 5B is a screen diagram illustrating a configuration of a denomination counts input screen and payout amount confirmation screen in the first exemplary embodiment.

FIG. 8A is a screen diagram illustrating a configuration of a denomination counts input screen and a payout amount confirmation screen related to a recursive transaction in the first exemplary embodiment.

FIG. 8B is a screen diagram illustrating a configuration of a denomination counts input screen and a payout amount confirmation screen related to a recursive transaction in the first exemplary embodiment.

FIG. 9 is a screen diagram illustrating a setting screen for a recursive transaction in the first exemplary embodiment.

DETAILED DESCRIPTION

First Exemplary Embodiment

A first exemplary embodiment of an information processing device according to the present disclosure will now be described in detail, with reference to the drawings.

In the first exemplary embodiment, an example is given of a case in which an information processing device according to the present disclosure is applied to a transaction processing device for respectively executing plural types of transaction processing. Note that the information processing device according to the present disclosure is not limited to a transaction processing device, and application may be widely made to any device that may repeatedly executes processing content executed in the past at approximately the same time band.

Figure 1:
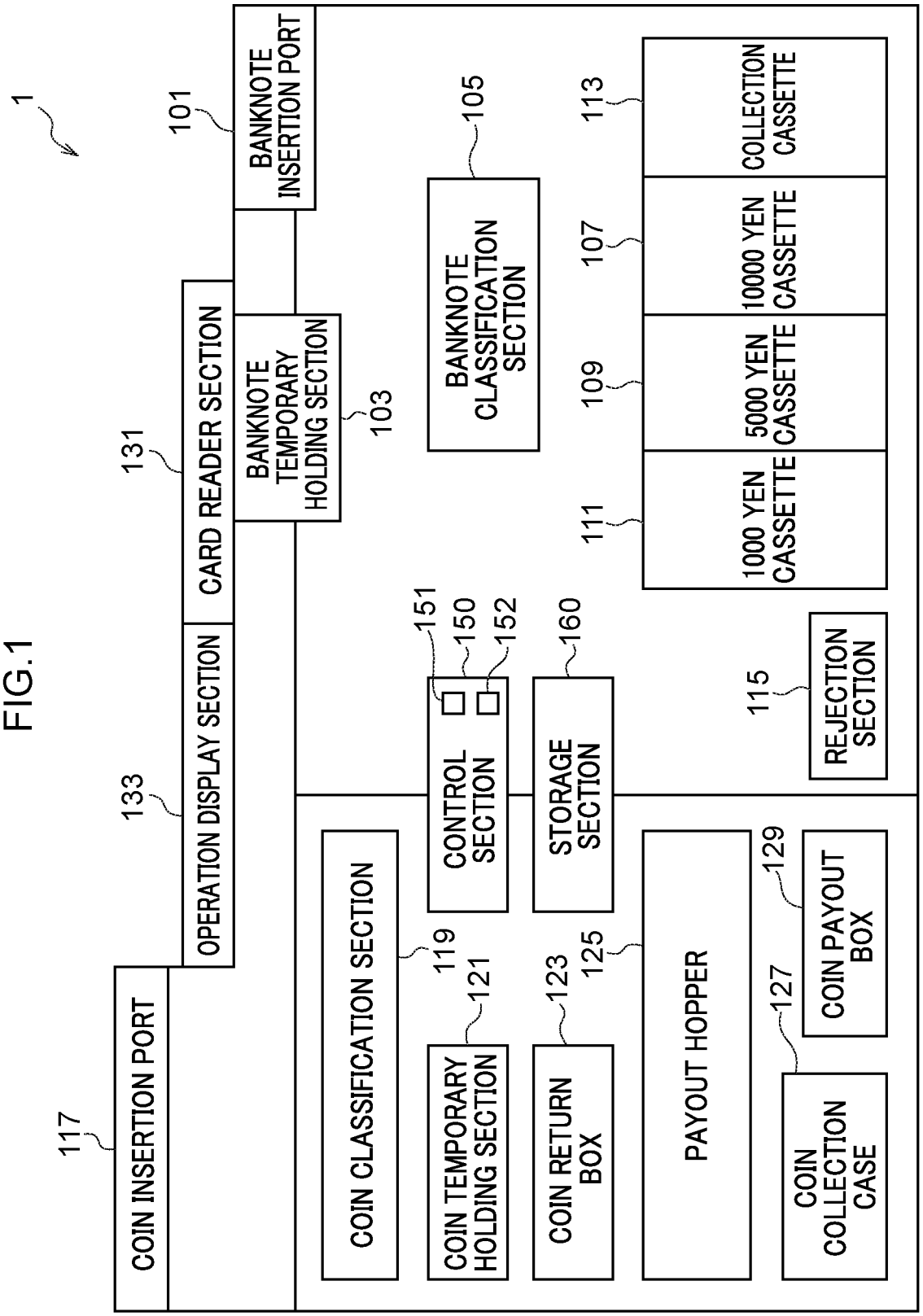
FIG. 1 is a configuration diagram illustrating a configuration of a transaction processing device according to a first exemplary embodiment.

FIG. 1 is a configuration diagram illustrating a configuration of a transaction processing device 1 according to the first exemplary embodiment.

The transaction processing device 1 in FIG. 1 includes a banknote insertion port 101, a banknote temporary holding section 103, a banknote classification section 105, a 10000 yen cassette 107, a 5000 yen cassette 109, a 1000 yen cassette 111, a collection cassette 113, a reject section 115, a coin insertion port 117, a coin classification section 119, a coin temporary holding section 121, a coin return box 123, a payout hopper 125, a coin collection case 127, a coin payout box 129, a card reader section 131, an operation display section 133, a control section 150, and a storage section 160.

The transaction processing device 1 may, for example, be applied to a cash dispensing machine installed in a retail store, such as a department store, supermarket, convenience store, or the like. Although explanation will be given of a case that envisages the transaction "medium" in the transaction processing device 1 to mainly be cash, such as banknotes and coins, there is no limitation thereto, and shopping vouchers, checks, tickets, banknote bundles, coin bars, and the like may also be included.

The transaction processing device 1 enables execution of processing such as change reserve payout for paying out cash (banknotes and/or coins) as a change reserve fund that is employed, for example, in a cash register (hereafter also referred to as a "register"), and processing such as sales pay-in for paying in cash (i.e., cash from sales and change reserve fund) stored in the register. The transaction processing of the transaction processing device 1 is not limited to change reserve payout and sales pay-in.

The banknote insertion port 101 is an insertion port for insertion of banknotes being paid into the transaction processing device 1. The banknote insertion port 101 is also a banknote payout port. Banknotes returned from the banknote insertion port 101 due to cancelation of a sales pay-in transaction, banknotes for being paid out, and banknotes that have been rejected as abnormal in the banknote classification section 105 are paid out from the banknote insertion port 101.

Banknotes are temporarily accumulated in the banknote temporary holding section 103 during pay-in counting and during sales receipts generation. Moreover, the banknote classification section 105 uses various sensors to classify whether or not an inserted banknote is a normal banknote.

The 10000 yen cassette 107, the 5000 yen cassette 109, and the 1000 yen cassette 111 are each a cash storage section for respectively storing banknotes of 10000 yen, 5000 yen, and 1000 yen. More specifically, the various banknotes that have been paid in as sales receipts and classified as normal by the banknote classification section 105 are stored in the 10000 yen cassette 107, the 5000 yen cassette 109, and the 1000 yen cassette 111 (these are collectively referred to as banknote cassettes). The 5000 yen cassette 109 and the 1000 yen cassette 111 also store banknotes of corresponding denominations as a change reserve fund. Furthermore, various banknotes are paid out from the 5000 yen cassette 109 and the 1000 yen cassette 111 during change reserve payout.

The collection cassette 113 is a cassette for sales receipts collection. Specifically, banknotes that have been moved from each of the banknote cassettes are stored in the collection cassette 113 as sales receipts during sales collection.

Banknotes that have been classified as abnormal banknotes by the banknote classification section 105, i.e. rejected banknotes, are accumulated in the reject section 115. Specifically, banknotes that are accumulated in the reject section 115 include: banknotes rejected by the banknote classification section 105 while banknotes are in the process of being conveyed from the banknote temporary holding section 103 to each of the banknote cassettes during sales pay-in, banknotes rejected by the banknote classification section 105 while in the process of performing change reserve payout from the banknote cassettes, and banknotes rejected by the banknote classification section 105 while banknotes are in the process of being conveyed from each of the banknote cassettes to the collection cassette 113 during sales collection.

The coin insertion port 117 is an insertion port for inserting coins into. The coin classification section 119 uses various sensors to classify whether or not an inserted coin is a normal coin. Furthermore, coins are temporarily accumulated in the coin temporary holding section 121 during pay-in counting and sales collection.

The coin return box 123 is a box to hold coins for return. For example, coins that have been counted, and coins resulting from cancelling sales pay-in, are returned to the coin return box 123. Moreover, various coins inserted by sales pay-in are stored in the payout hopper 125 (cash holding section), and various coins are paid out from the payout hopper 125 during change reserve payout.

The coin collection case 127 is a cassette for sales collection. Specifically, coins moved from the payout hopper 125 during sales collection are stored as sales receipts in the coin collection case 127. The coin payout box 129 is a coin payout port for paying out coins during change reserve payout.

The card reader section 131 is an example of an input section that reads out information that has been written to a card of an operator, such as a card of a store manager or cashier for example. Examples of information written to the operator's card include information indicating a cash register identification number to identify the cash register the operator is manning, and the class of operator (classes such as, for example, manager, regular staff, and part-timer). Note that user identification information to identify the operator using the card (for example, a user ID number) and the like may be written to the card.

The operation display section 133 encompasses both a function as an operation section or input section for detecting operation by the operator, and a function as a display section to display various screens. The display section function may be realized, for example, by a cathode ray tube (CRT) display device, a liquid crystal display (LCD) device, and/or an organic light emitting diode (OLED) device. Moreover, the operation section function may be realized, for example, by a touch panel. Note that the display section function and the operation section function may be separately provided.

The control section 150 is configured by a central processing unit (CPU) that is an arithmetic processor, read only memory (ROM) stored with programs, computational parameters, and the like used by the CPU, random access memory (RAM) for temporarily storing programs for use in execution by the CPU and parameters to appropriately change such execution, and a storage device for data storage, such as a hard disk drive (HDD) for storing data and the like. Processing programs (for example, a recursive transaction program and processing programs for various transactions) are stored in the ROM, and these transactions are implemented by the CPU executing each of the processing programs.

The control section 150 controls the overall operation of the transaction processing device 1. For example, the control section 150 encompasses a management section function to store, the storage section 160, the respective numbers of cash units stored in each of the banknote cassettes and in the payout hopper 125. After authentication has been finished using the operator's card and a PIN etc., the control section 150 displays a menu screen on the operation display section 133 for an operator to select a desired processing, and controls the processing selected on the menu by the operator.

The control section 150 stores transaction content information, including date/time information and transaction content as executed by the transaction processing device 1, as historical information in the storage section 160.

The control section 150 includes a search section 151 that, when operator authentication has succeeded, references the historical information stored in the storage section 160, and searches for information related to the same transaction with the same transaction content repeatedly executed in the past.

The control section 150 also includes a display control section 152 that, based on the results of the search by the search section 151, displays a screen including a recursive transaction selection button on the operation display section 133, and when the selection button has been selected, automatically switching the display to plural operation screens showing the transaction content of the recursive transaction. Note that in cases in which no instances of the same transaction with the same transaction content are found, then a normal menu screen, as described above, is displayed on the operation display section 133 to execute the transaction processing that has been selected. As described above, the transaction processing device 1 is used, for example, for sales control and change reserve funds.

Detailed explanation follows regarding a recursive transaction processing operation in the transaction processing device 1 according to the first exemplary embodiment, with reference to the drawings.

Reference here to "recursive transaction" means a transaction that is, when searched based on the date/time information of operation by the operator with reference to the past historical information, a transaction repeatedly executed with the same transaction content in the same time band as the operation date/time information. In other words, a recursive transaction is the same transaction with the same transaction content as a transaction executed in the past.

"Processing employing recursive transaction" in the transaction processing device 1 refers to, in cases in which there is a transaction repeatedly executed in the past with the same condition as the current condition, executing a transaction with the same transaction content repeatedly executed in the past by a simple operation on the operation display section 133.

More specifically, in cases in which a transaction has been found that was repeatedly executed in the past, a screen including a recursive transaction button is displayed on the operation display section 133 of the transaction processing device 1. When the recursive transaction button is selected by an operator, an operation screen is displayed reflecting (i.e., showing) the same transaction with the same transaction content repeatedly executed in the past, and then the operation screen automatically transitions through the sequence of that transaction procedure. Note that the finally displayed screen in the sequence of the transaction procedure is a screen to finally confirm (finalize) the transaction content, prompting confirmation of the transaction content by the operator and selection of the confirm button by the operator. In other words, by selecting a transaction button (the recursive transaction button) once, the operator is able to obtain the same transaction with the same transaction content as repeatedly executed in the past for the transaction and the transaction content this time. In this manner, the burden on the operator to input and select transaction content on each of the operation screens is reduced and, therefore, mistaken pressing of operation buttons may be prevented.

Examples of factors that may be used as the condition for searching for transactions repeatedly executed in the past (i.e., recursive transaction search condition) includes any one out of "time band (time)", "day of the week", "cash register number (register number)", or "operator (user ID number)" for transactions executed by the transaction processing device 1, or a combination thereof. In other words, the above condition may use a condition of a timewise factor such as "time band", a day type factor such as "day of the week" or "holiday", or a factor to identify a search target, such as "cash register number" and "operator (user ID number)". However, the recursive transaction search condition is not limited to those listed above.

For example, in cases in which the condition is "time band", then the transaction processing device 1 searches for whether or not there is a transaction with the same transaction content has been repeatedly executed in the past in substantially the same time band as the current operation time, by looking back a few days in the past or about one week in the past. More specifically, in the transaction processing device 1, for example, after authentication of the operator performing a transaction operation has succeeded, the control section 150 looks at historical information for yesterday and two days ago in the historical information including the past transaction content information, and searches for whether or not the same transaction with the same transaction content has been executed in substantially the same time band as the current time. The control section 150 then retrieves the same transaction with the same transaction content executed in the same time band yesterday and two days ago as a candidate for the transaction and transaction content (recursive transaction) at this time.

For example, in cases in which the condition is "day of the week", then the transaction processing device 1 searches for whether or not there is a transaction with the same transaction content that has been repeatedly executed in the past in substantially the same time band as the current operation time and on the same day of the week as the current day by looking back several weeks in the past. More specifically, for example, after authentication of the operator performing the transaction operation has succeeded in the transaction processing device 1, the control section 150 looks at the historical information for the same day of the week in the previous week and two weeks ago in the historical information including past transaction content information, and searches for whether or not the same transaction with the same transaction content has been executed in substantially the same time band as the current time. The control section 150 then retrieves the same transaction with the same transaction content executed in the same time band in the previous week and two weeks ago as a candidate for the transaction and transaction content (recursive transaction) at this time.

For example, in cases in which "cash register number" is the condition, the transaction processing device 1 searches the historical information of past executions corresponding to the cash register number for whether or not a transaction with the same transaction content has been repeatedly executed in the past. More specifically, for example, after in the transaction processing device 1 authentication of the operator performing the transaction operation has succeeded, the control section 150 looks at past historical information with the cash register number specified by the operator in the historical information including the past transaction content information, and searches for whether or not the same transaction with the same transaction content has been executed in substantially the same time band as the current time. Note that a condition search may be performed by combining the conditions of "time band", "day of the week" and the like. The control section 150 then retrieves the same transaction with the same transaction content executed in relation to the specified cash register number at the same time band as a candidate for the transaction and transaction content (recursive transaction) at this time.

Moreover, for example, in cases in which the condition is the "operator (user ID number, hereinafter, simply referred to as "ID number")", the transaction processing device 1 searches for whether or not there is a transaction with the same transaction content that has been repeatedly executed in the past in the past historical information, and in relation to the operator ID number. More specifically, for example, after authentication of the operator performing the transaction operation has succeeded in the transaction processing device 1, the control section 150 looks at past historical information with the ID number specified by the operator in the historical information including the past transaction content information, and searches for whether or not the same transaction with the same transaction content has been executed in substantially the same time band as the current time. Note that a condition search may be performed by combining the conditions of "time band", "day of the week" and the like. The control section 150 then retrieves the same transaction with the same transaction content executed in relation to the specified ID number in the same time band as a candidate for the transaction and transaction content (recursive transaction) at this time.

Next, description follows regarding an example of a recursive transaction setting method according to the first exemplary embodiment.

The recursive transaction setting method is not particularly limited, and setting content may be set in advance, or may be customized by a user (e.g., manager, operator, or the like). An example is given here, with reference to FIG. 9, of a case in which the recursive transaction setting content is set on the operation display section 133 of the transaction processing device 1.

FIG. 9 is a screen diagram illustrating a setting screen for a recursive transaction (also referred to as "fifth screen") according to the first exemplary embodiment.

On the setting screen 700 of the recursive transaction of FIG. 9, settings is able to be made for "day of the week search" using the day of the week as the recursive transaction search condition, "time band search" using the time band as the recursive transaction search condition, "specify register" that allows the cash register number to be specified, and "specify ID" that allows the user ID number of the operator to be specified.

As illustrated in the example of FIG. 9, the "day of the week search" setting item 711, the "time band search" setting item 712, the "specify cash register" setting item 713, the "specify ID" setting item 714 include, for example, check boxes that allow a user (e.g., manager, operator, or the like) to select the desired condition setting. A configuration may be adopted in which not only one setting item, but plural setting items may be selected.

In FIG. 9, the "day of the week search" setting item 711 and the "time band search" setting item 712 allow a user to set a "search range" to specify a range of search in the historical information, and a "time band width" to specify which times are to be treated as being substantially the same as the current operation time.

For example, in the "day of the week search" setting item 711 of FIG. 9, were the "search range" to be set to "two weeks ago", then that example case would be a search for the same day of the week as the current operation day of the week in the previous week and two weeks ago. Note that the "search range" of the setting item 711 is not limited to "two weeks ago", and "previous four weeks", "previous two months", "previous half year", or the like may be set therefor. Moreover, in the "day of the week search" setting item 711 of FIG. 9, were the "time width" to be set to "30 minutes", then the range that is treated as being the same time band would be 30 minutes centered on the current operation time, namely a range from 15 minutes before the current time to 15 minutes after the current operation time. Similar applies to the "search range" and the "time width" of the "time band search" setting item 712.

Moreover, a "time width" to be treated as substantially the same time as the current operation time may also be set for the "specify cash register" setting item 713 and the "specify ID" setting item 714.

Note that in cases in which plural setting items are set among the setting item 711, the setting item 712, the setting item 713, and the setting item 714, instead of setting the "time width" for each of the setting items, setting the "time width" of a high priority setting item may be treated as setting the "time width" for the other items.

For example, in the example in FIG. 9, assume that the "day of the week" has the highest priority, and the "time band search", the "specify cash register", and the "specify ID" respectively have their priorities in this sequence in a descending order. In this case, when the "day of the week search" and the "specify cash register" setting items 711 and 713 have been selected, by merely setting the "time width" in the "day of the week search" setting item 711, this "time width" set in the "day of the week search" setting item 711 may effectively function also for the "specify cash register" item, even without setting the "time width" in the "specify cash register" setting item 713. In such cases, for example, the setting content of the "time width" in the "day of the week search" setting item 711 may be automatically copy-and-pasted into the "time width" of the "specify cash register" setting item 713, or, for example, when the time width" is set in the "day of the week search" setting item 711, the text box for the "time width" of the "specify cash register" setting item 713 may be reversed so that input is disabled. This enables double setting of the "time width" to be avoided.

Figure 2:
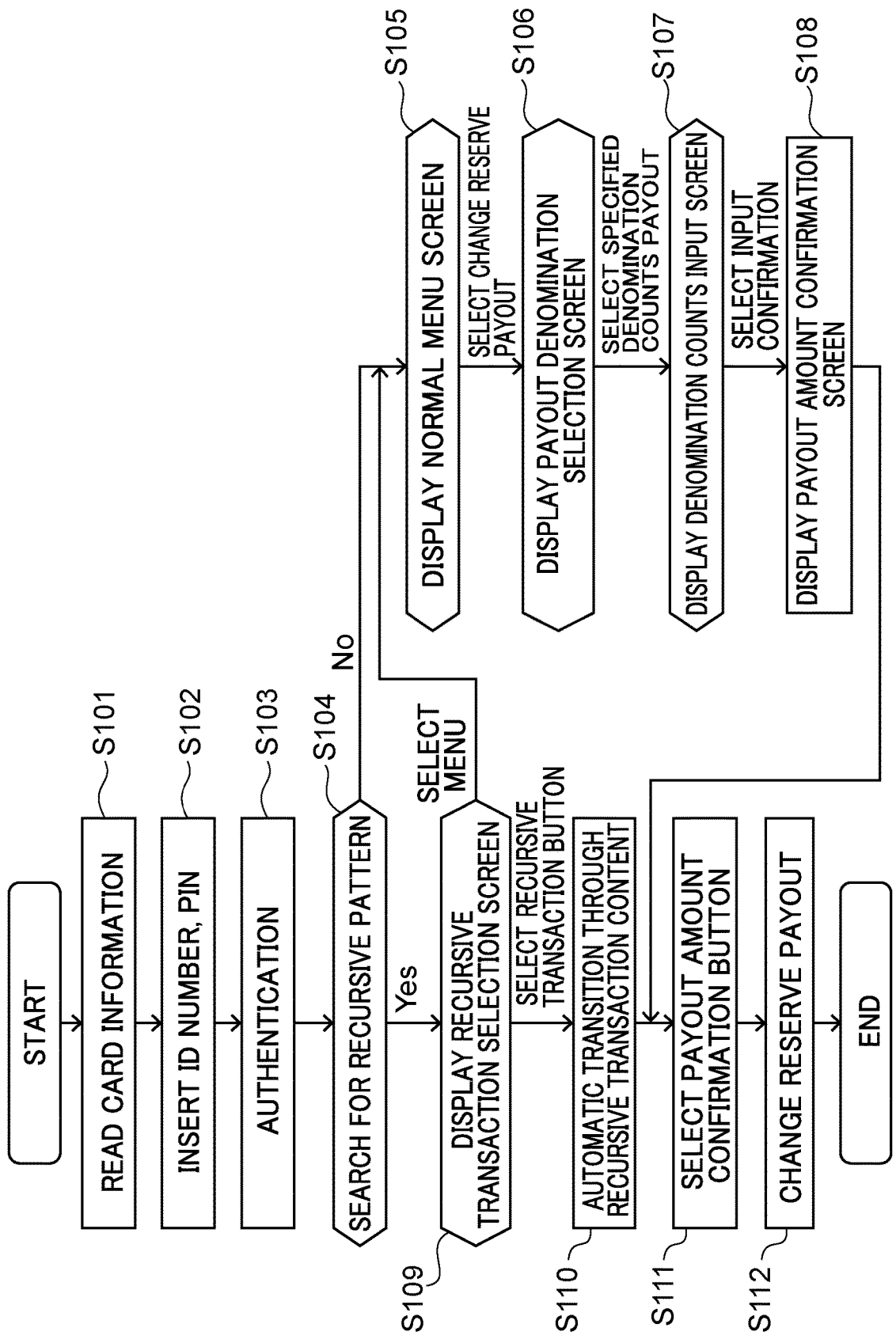
FIG. 2 is a flowchart illustrating a recursive transaction processing operation in the transaction processing device according to the first exemplary embodiment.

FIG. 2 is a flowchart illustrating recursive transaction processing operation in the transaction processing device 1 according to the first exemplary embodiment. An example will now be given of a case in which, as illustrated in the example of FIG. 9, the "time band search" has been selected and also "specify cash register" has been selected. In the "time band search", the same time band has been specified as the "search range" back to "two days ago", and the "time width" has been specified as "30 minutes".

An example follows of processing for a case in which change reserve payout is executed among transactions executable in the transaction processing device 1. Note that the recursive transaction processing is not limited to change reserve payout.

First, login processing is performed by an operator using the transaction processing device 1. For example, card information stored in a recording medium (for example, a magnetic stripe or an IC chip) attached to a card is read in by the card reader section 131, such as by the operator swiping the card in the card reader section 131 or by the operator inserting the card into the card reader section 131 (S101). For example, the class of operator and a cash register number may be included in the card information. In the operation display section 133, the user ID number of the operator and PIN are input (S102), and authentication processing is executed based on the input ID number and the PIN recorded in the storage section 160 (S103). Note that in cases in which user identification information is not written in the card, the user ID number and PIN may be input to the operation display section 133.

Next, after login authentication of the operator has succeeded, search processing is performed in the transaction processing device 1 for recursive transaction content (S104). Processing transitions to S105 in cases in which there is no recursive transaction content present (i.e., none found), and processing transitions to S109 in cases in which recursive transaction content is present (i.e., found).

FIG. 3 is a configuration diagram illustrating a configuration of historical information including transaction and transaction content stored in the transaction processing device 1 of the first exemplary embodiment.

The transaction processing device 1 stores executed transactions and their transaction content as historical information every time a transaction is executed. The historical information illustrated as an example in FIG. 3 is stored in the transaction processing device 1.

The historical information (transaction content information) illustrated in FIG. 3 includes: "Date (year/month/day)" indicating the date of execution in the transaction processing device 1; "Time (hour: min)" indicating the execution time; "ID Number" uniquely identifying an operator; "Register Number" uniquely identifying the cash register; "Transaction Class" indicating the type of transaction executed in the transaction processing device 1; "Amount" indicating the amount transacted in the transaction processing device 1; and denomination counts for "10000 yen", "5000 yen", "1000 yen", "500 yen", "100 yen", "50 yen", "10 yen", "5 yen", and "1 yen" in relation to a transaction. Note that the historical information is not limited to that of the example in FIG. 3 and, for example, the name of the operator or the like may be included.

Take, for example, a case in which the current date/time information is "Time (9:15)" on "Date (2019/12/18)". This date/time is the date/time when login authentication of the operator was achieved in the transaction processing device 1 using a card including information of cash register number "1".

The control section 150 searches in the past transaction content information (historical information) illustrated in FIG. 3 for a transaction with the same transaction content repeatedly executed in a range of 30 minutes centered on the current operation time, namely in a range of time width 15 minutes on either side of the current time.

Specifically, a transaction for change reserve payout is found as a transaction that was executed in the same time band to the current "Time (9:15)" on "Date (2019/12/18)" in FIG. 3, this being the change reserve payout transaction performed in the previous day to today at "Time (9:20)" on "Date (2019/12/17)" by operator "ID Number: 111111" on "Register Number: 1" for a reserve cash fund of 10×1000 yen notes, 2×500 yen coins, 15×100 yen coins, 20×10 yen coins, 4×5 yen coins, and 10×1 yen coins.

A further transaction found is the change reserve payout performed two days before today at "Time (9:11)" on "Date (2019/12/16)" by operator "ID Number: 111111" on "Register Number: 1" for a change reserve fund of 10×1000 yen notes, 2×500 yen coins, 15×100 yen coins, 20×10 yen coins, 4×5 yen coins, and 10×1 yen coin.

The transaction the previous day and the transaction two days ago listed above are both "change reserve payout", i.e., the same transaction class and, moreover, the transaction content (denomination counts) of the change reserve payout in the previous day is the same as the transaction content (denomination counts) of the change reserve payout two days ago. Accordingly, in this example the change reserve payout transaction for a change reserve fund of 10×1000 yen notes, 2×500 yen coins, 15×100 yen coins, 20×10 yen coins, 4×5 yen coins, and 10×1 yen coin may be searched as a recursive transaction.

Note that although explanation has been given in the example described above using one day and two days ago for time interval counting back in the past when searching for a recursive transaction, the search for a recursive transaction may be performed in the historical information for several days before, or for one week or so in the past.

Processing transitions to S109 in cases in which there is, in the past historical information, the same transaction with the same transaction content in substantially the same time band as the current time band counting back in the past. Processing transitions to S105 in cases in which there is no same transaction with the same transaction content.

Note that although explanation here is of a case in which a recursive transaction search condition is "time band search" in which a "time width" is set to "30 minutes" for the time band, and in which "specify cash register" has been set, in cases in which the recursive transaction setting content has not been set, a search may be performed for transactions having the same transaction content repeatedly executed at substantially the same time as the current time.

Reference here to substantially the same time as the current time is not limited to the same time as the current time, and taking the current time as the reference, may be a time contained in a specific time range before and after, or may be a time contained in a time width of the same time band. The time width to be considered as the same time band may be previously set as an initial value.

Next, description follows regarding processing for cases in which there is no recursive transaction content present at S104, with reference to the screen diagrams of FIG. 4A to FIG. 6B.

In cases in which there is no recursive transaction content present, a menu screen is initially displayed on the operation display section 133, and after the change reserve payout selection button has been selected, the operator performs processing for change reserve payout by selection and input on the operation screens that follow the processing procedure for the change reserve payout.

Figure 4A:
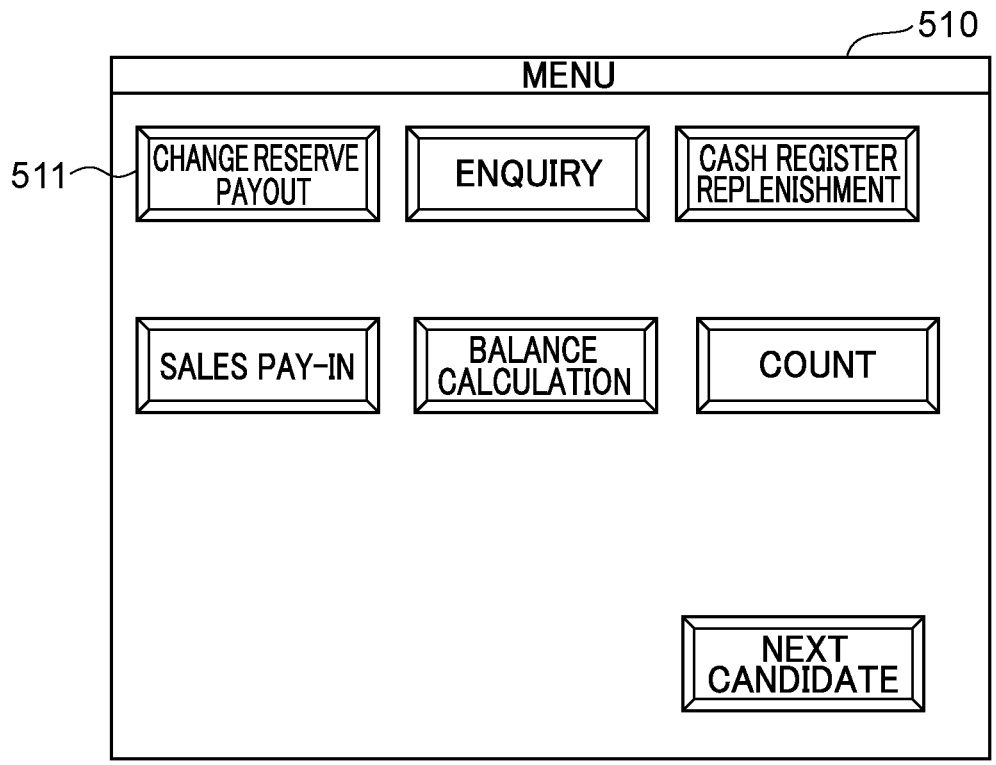
FIG. 4A is a screen diagram illustrating a configuration of a menu screen and payout denomination selection screen in the first exemplary embodiment.

Namely, in cases in which there is no recursive transaction content present, the menu screen 510 (referred to as "fourth screen") of FIG. 4A is displayed on the operation display section 133 (S105). Selection buttons are displayed on the menu screen 510 of FIG. 4A for selecting a transaction class executable in the transaction processing device 1, such as "change reserve payout", "sales pay-in", "change", "count" and the like, and the operator is able to select the selection button of the desired transaction for execution therefrom.

In the case of this example, the operator selects a change reserve payout button 511 on the menu screen 510 of FIG. 4A. Then, a payout class selection screen 520 of FIG. 4B is displayed on the operation display section 133 (S106) to allow selection of denominations for the change reserve payout.

For example, change reserve payouts include pattern payouts, in which a pattern of denomination counts for payout is set according to the shift of the register operator, and specified denomination counts payouts, in which the denomination counts are specified each time the change reserve payout is executed. A pattern payout button 521 for selecting pattern payout, and a specified denomination counts payout button 522 for selecting specified denomination counts payout, are displayed on the payout class selection screen 520 of FIG. 4B, and the operator is able to select one or other as the payout class. Note that although an example is given here of a case in which the classes of change reserve payout are two classes, there may be three of more classes, and in such cases three of more buttons may be displayed to enable selection of whichever class.

Figure 4B:
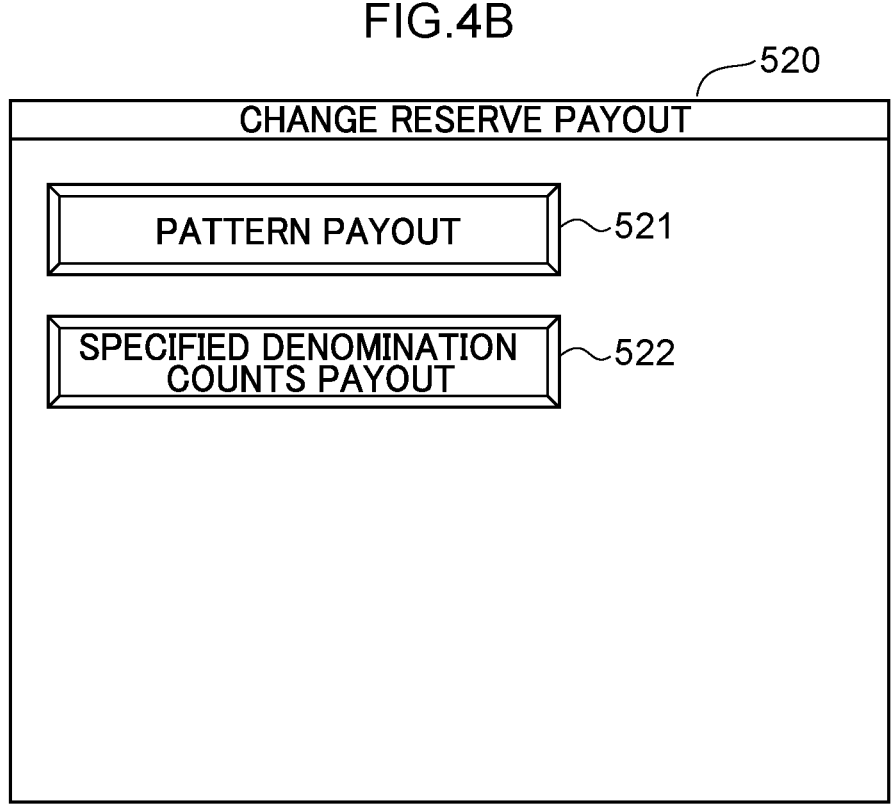
FIG. 4B is a screen diagram illustrating a configuration of a menu screen and payout denomination selection screen in the first exemplary embodiment.

In this example, the specified denomination counts payout button 522 is selected on the payout class selection screen 520 of FIG. 4B.

At S107, a denomination counts input screen 530 of FIG. 5A is displayed on the operation display section 133 for inputting the denomination counts (S107). Input sections 531 and 532 are included in the denomination counts input screen 530 of FIG. 5A for specifying the denomination counts, and the operator operates the input sections 531 and 532 to input the denomination counts.

After input of the denomination counts is complete, the operator selects a confirmation button 533 to transition to the next procedure. A payout amount confirmation screen 540 of FIG. 5B is then displayed on the operation display section 133 in order to confirm the denomination counts and the payout amount (S108).

The denomination counts input on the denomination counts input screen 530 of FIG. 5A and the payout amount (total amount) are displayed on the payout amount confirmation screen 540 of FIG. 5B, enabling confirmation of the denomination counts and payout amount.

In a case in which there is a need to change the denomination counts or payout amount, a correction button 541 is selected by the operator, and re-input of the denomination counts is performed on the payout amount confirmation screen 540 of FIG. 5B by operating input sections 542 and 543.

Figure 6A:
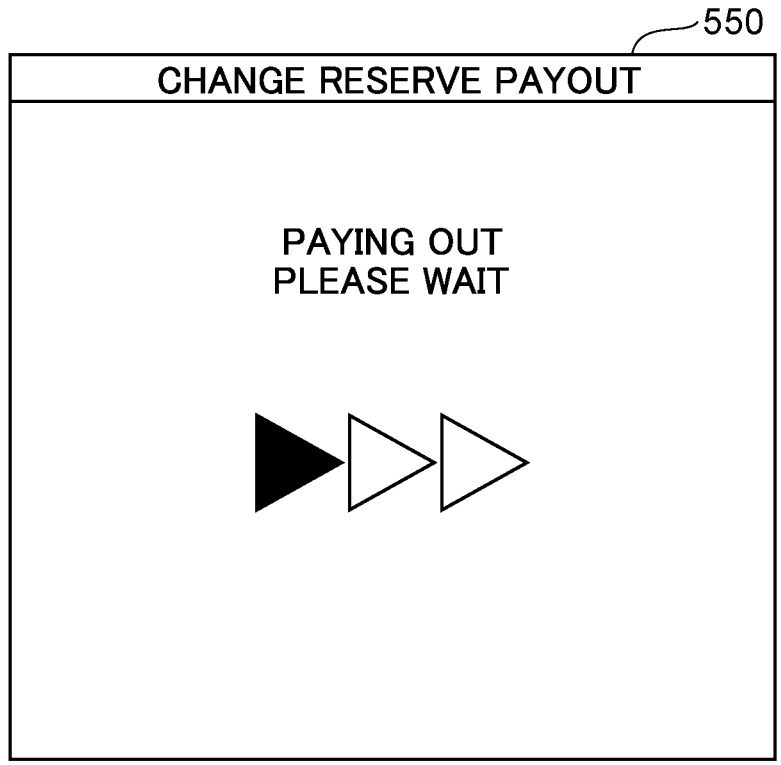
FIG. 6A is a screen diagram illustrating a configuration of a change reserve payout standby screen and end screen of the first exemplary embodiment.

However, in a case in which there are no changes for the denomination counts and payout amount, the operator selects a confirmation button 544 on the payout amount confirmation screen 540 of the FIG. 5B (S111). Then, processing is performed in the transaction processing device 1 for change reserve payout in the specified denomination counts, and while this is being performed a change reserve payout standby screen 550 of FIG. 6A is displayed on the operation display section 133.

Figure 6B:
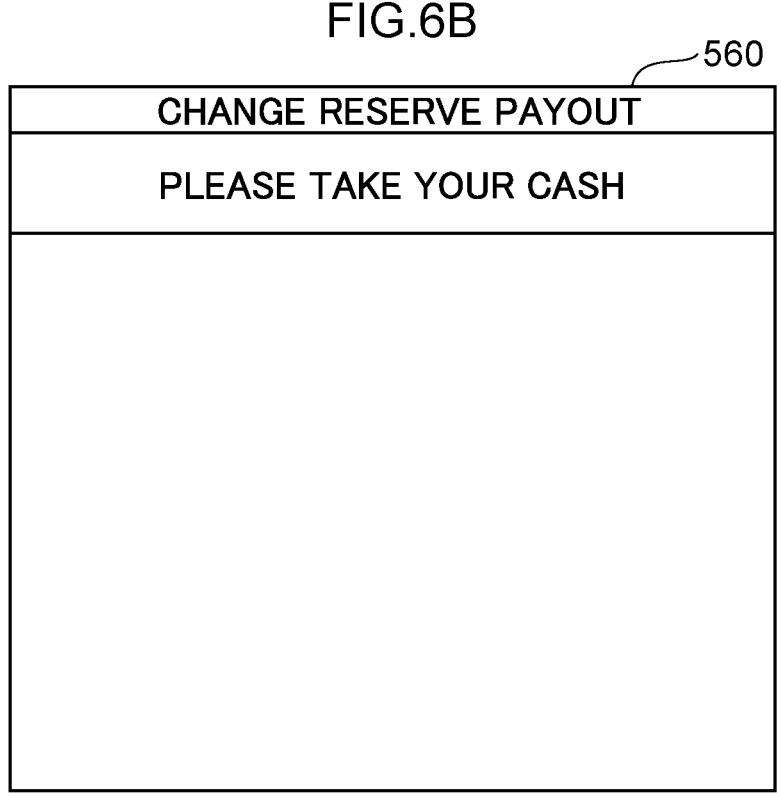
FIG. 6B is a screen diagram illustrating a configuration of a change reserve payout standby screen and end screen of the first exemplary embodiment.

Cash (banknotes, coins) of the specified denomination counts is then paid out (S112). Thereafter, an end screen 560 of FIG. 6B is displayed on the operation display section 133 to prompt an operator to take the cash.

As described above, in cases in which there is no recursive transaction content present, selection and input is performed by the operator on the operation screens, and the procedure for change reserve payout is performed.

Explanation next follows regarding processing in cases in which there is a recursive transaction content present at S104, with reference to the screen diagrams of FIGS. 7A, 7B, FIGS. 8A, 8B, and FIGS. 6A, 6B.

In cases in which there is a recursive transaction content present, firstly, a screen that contains a selection button for selecting a recursive transaction is displayed. Then, after the recursive transaction selection button has been selected by the operator, transition is made to automatically switching the operation screens showing the past recursive transaction content, and the processing of change reserve payout is performed according to the change reserve payout procedure.

Figure 7A:
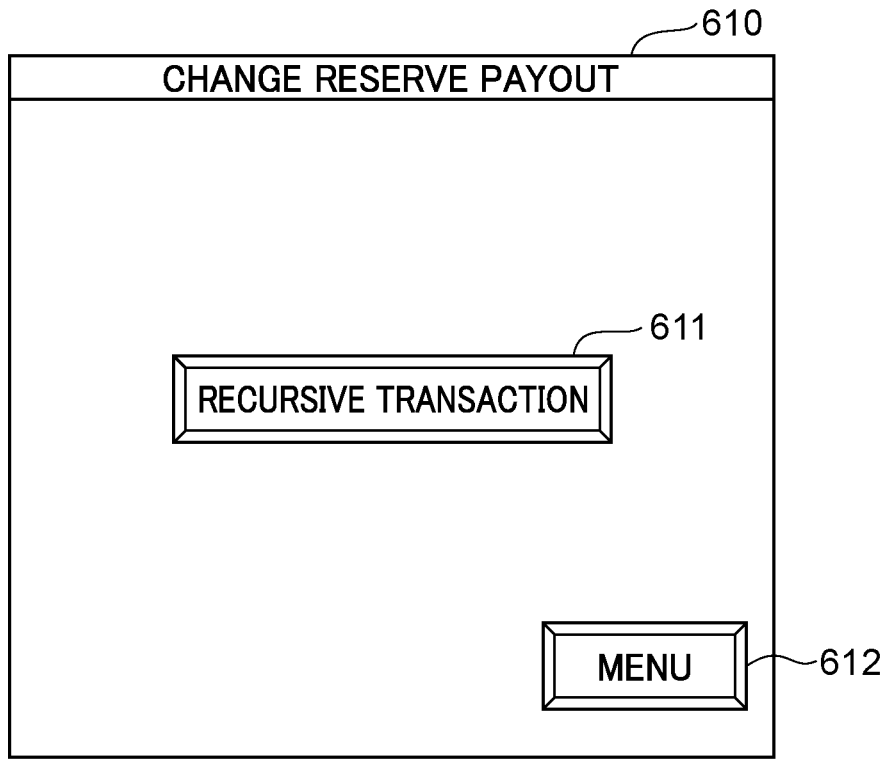
FIG. 7A is a screen diagram illustrating a configuration of a selection screen and a payout denomination selection screen related to a recursive transaction in the first exemplary embodiment.

Namely, in cases in which there is a recursive transaction content present, a recursive transaction selection screen 610 (also referred to as "first screen") of FIG. 7A is displayed on the operation display section 133 (S109).

In other words, in order to allow execution of the same transaction as a transaction content repeatedly executed in the same time band in the past, without displaying the menu screen 510 of FIG. 4A, the selection screen 610 including a recursive transaction selection button 611 is displayed, as illustrated in the example of FIG. 7A. "Change reserve payout" is displayed in FIG. 7A because change reserve payout has been found as the transaction class in the recursive transaction search of S104.

After the recursive transaction selection button 611 has been selected, a transition is made to automatic switching through the operation screens showing the transaction content that was repeatedly executed in the past (S110). Namely, progression is made to the change reserve payout operation processing merely by the operator selecting the recursive transaction selection button 611 once on the recursive transaction selection screen 610 of FIG. 7A, enabling button pressing mistakes by an operator to be avoided.

Note that, in order to allow the menu screen to be displayed, a menu button 612 for transitioning to the menu screen 510 is included in the recursive transaction selection screen 610 of FIG. 7A.

A more specific explanation will now be given regarding automatic transition of the screens displayed on the operation display section 133.

Figure 7B:
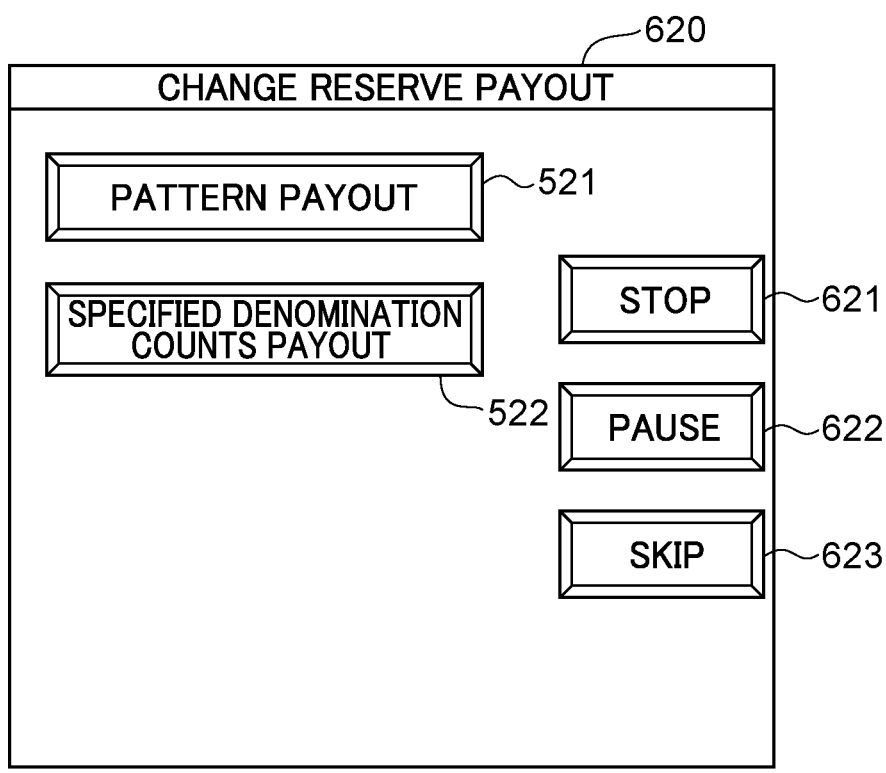
FIG. 7B is a screen diagram illustrating a configuration of a selection screen and a payout denomination selection screen related to a recursive transaction in the first exemplary embodiment.

After the recursive transaction selection button 611 has been selected on the recursive transaction selection screen 610 of FIG. 7A, a payout class selection screen 620 (referred to as "second screen") of FIG. 7B is displayed on the operation display section 133. Then, after the passage of a specific period of time, a denomination counts input screen 630 (referred to as "third screen") of FIG. 8A is displayed automatically on the operation display section 133, and then after a further specific period of time has elapsed, a payout amount confirmation screen 640 (referred to as "third screen") of FIG. 8B is displayed automatically on the operation display section 133.

The screen configurations of the payout class selection screen 620 of FIG. 7B, the denomination counts input screen 630 of FIG. 8A, and the payout amount confirmation screen 640 of FIG. 8B are each, fundamentally, similar to the payout class selection screen 520 of FIG. 4B, the denomination counts input screen 530 of FIG. 5A, and the payout amount confirmation screen 540 of FIG. 5B. However, the payout class selection screen 620 of FIG. 7B, the denomination counts input screen 630 of FIG. 8A, and the payout amount confirmation screen 640 of FIG. 8B are each provided with a stop button 621, a pause button 622, and a skip button 623.

The stop button 621 is a button to stop the automatic transitioning of the screens. The automatic transitioning of the screens is terminated by selection of the stop button 621. Then, subsequent screen transitions are performed manually (i.e. by manual input) by the operator. The stop button 621 provides a useful function in cases, for example, there is a desire to change the payout class and change the type of transaction to be executed.

The pause button 622 is a button to pause the screens that are being switched automatically. The screen transition is paused by selection of the pause button 622, and the screen being displayed at this point in time is statically displayed on the operation display section 133. The pause button 622 provides a useful function in cases, for example, in which the same transaction (for example, change reserve payout) as a transaction repeatedly executed in the past is to be executed, but there is a desire to change the transaction content (for example, the denomination counts or the like).

The skip button 623 is a button to skip to the final screen. For example, the display is skipped to the payout amount confirmation screen 640 of FIG. 8B, which is the final screen in this example, by selecting the skip button 623. This provides a useful function such as when speedy execution is desired for a transaction with the same content as the transaction content (denomination counts) repeatedly executed in the past.

Then, the confirmation button 544 is selected by the operator on the payout amount confirmation screen 640 of FIG. 8B in order to fix the change reserve payout transaction content (S111). Thereafter, change reserve payout processing is performed in the transaction processing device 1 for the specified denomination counts, and while that is being performed, the change reserve payout standby screen 550 of FIG. 6A is displayed on the operation display section 133.

Note that although an example has been given of a case in which the stop button 621, the pause button 622, and the skip button 623 are provided even on the payout amount confirmation screen 640 of FIG. 8B, a configuration may be adopted in which the stop button 621, the pause button 622, and the skip button 623 are not displayed on the screen of FIG. 8B since this is the final screen in the change reserve payout procedure. Not displaying these buttons 621, 622, and 623 enables the operator to be made aware that the procedure has ended and be made aware of transaction content confirmation etc., enabling a request to be made to select the "confirmation button" 544 after confirming the transaction content.

Then, the cash (banknotes, coins) are paid out in the specified denomination counts (S112). Thereafter, the end screen 560 of FIG. 6B is displayed on the operation display section 133 in order to prompt the operator to take the cash.

As described above, in cases in which there is a transaction executed repeatedly in the past with the same transaction content, and there is a desire to execute a transaction with the same transaction content this time, the first exemplary embodiment enables this merely by the operator making a single selection of the recursive transaction selection button, enabling operational mistakes or input mistakes to be prevented.

Second Exemplary Embodiment

Next, detailed explanation follows regarding a second exemplary embodiment of an information processing device according to the present disclosure, with reference to the drawings.

The second exemplary embodiment has, fundamentally, the same configuration and operation to that explained for the first exemplary embodiment, but differs from the first exemplary embodiment in the configuration of the screens displayed on the operation display section 133. Thus, explanation below will focus on the configuration of the screens in recursive transactions according to the second exemplary embodiment.

Figure 10A:
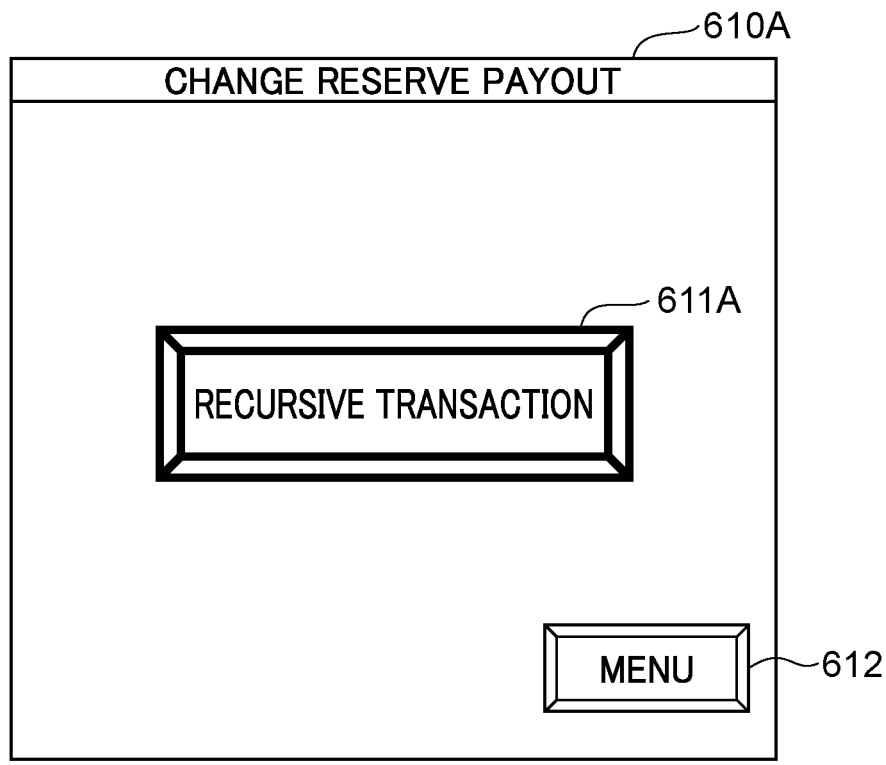
FIG. 10A is a screen diagram illustrating a configuration of a selection screen and a payout denomination selection screen related to a recursive transaction in a second exemplary embodiment.
Figure 10B:
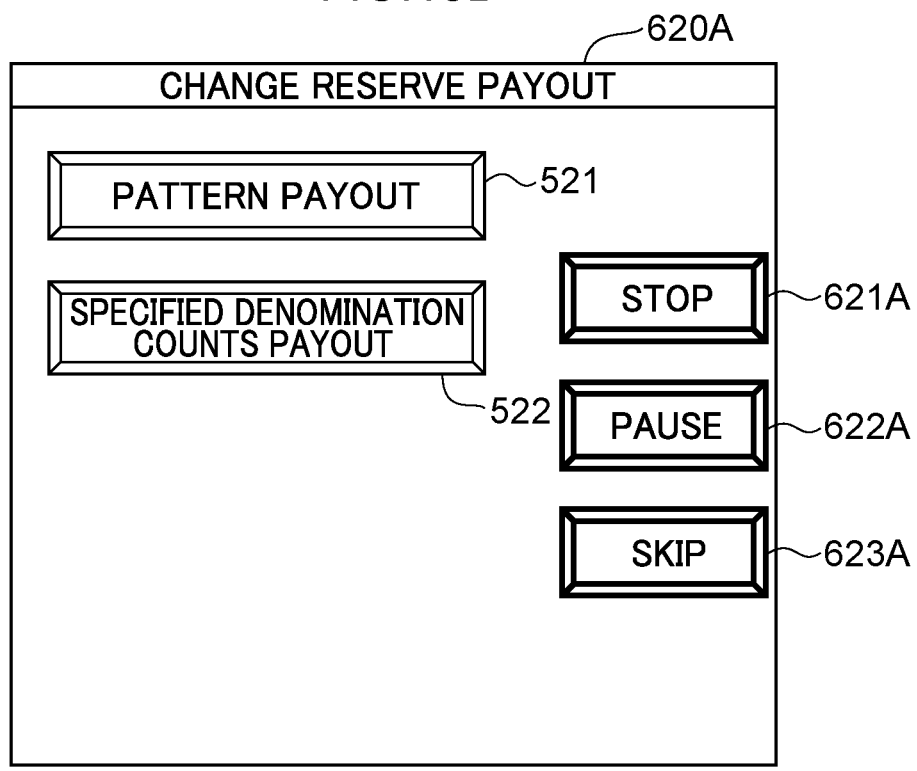
FIG. 10B is a screen diagram illustrating a configuration of a selection screen and a payout denomination selection screen related to a recursive transaction in a second exemplary embodiment.

FIG. 10A is a selection screen (referred to as "first screen") according the recursive transaction of the second exemplary embodiment, and FIG. 10B is a payout class selection screen (referred to as "second screen") related to a recursive transaction of the second exemplary embodiment.

The recursive transaction selection button 611A is displayed with emphasis on a selection screen 610A of FIG. 10A. This enables the operator to be guided to selecting the recursive transaction.

A stop button 622A, a pause button 622A, and a skip button 623A are displayed with emphasis on a screen 620A of FIG. 10B. This enables the operator to be made aware of operations on the screen operations such as stop, pause, and the like when the screens are switching automatically. Note that although an example is given of a case in which each button of the stop button 622A, the pause button 622A, and the skip button 623A are emphasized in the same display manner on the screen 620A of FIG. 10B, the display manner may be different for each of the buttons.

The manner of emphasized display is not particularly limited and, for example, the lines of the button boxes may be made bold, the line color of the button boxes may be given a color to raise awareness such as red or the like, the size of the button may be enlarged, the button may be placed at the center of the screen, and/or the button may be made to flash. A combination of these types of emphasis display may also be adopted.

In this manner, in addition to the effects of the first exemplary embodiment, the second exemplary embodiment is also able to guide the operator to the recursive transaction by performing emphasized display of particular buttons provided on each of the screens related to a recursive transaction, enabling the operator to be made aware of the operations on the screens that are transitioning automatically.

Other Exemplary Embodiments

Although various modified exemplary embodiments have been mentioned for the exemplary embodiments described above, the following modified exemplary embodiments may also be applied in the present disclosure.

In the first and second exemplary embodiments described above, examples have been given of cases in which the search for a recursive transaction having the same time band and the like in the operation date/time information is performed after successful operator authentication, and the selection screen allowing selection of such recursive transactions (recursive transaction selection button) is displayed. However, there is no limitation thereto. For example, in cases in which the transaction processing device may coordinate with an attendance management system for the manager, operator, or the like, the transaction processing device may allow search for recursive transaction having the same time band and the like in attendance date/time information of the manager, operator, or the like in the attendance management system.

Although the displays of the operation screens are automatically switched according to the transaction processing procedure after selection of a recursive transaction, the times related to such screen switching may be set as appropriate.

For example, since the payout class selection screen 620 of FIG. 7B is easily ascertainable by the operator, a comparatively short setting, such as one second or the like, may be considered for the switching time to the next denomination counts input screen 630 of FIG. 8A. However, the denomination counts input screen 630 of FIG. 8A may need time for the operator to confirm. Thus, the switching time to the next payout amount confirmation screen 640 of FIG. 8B may, for example, be slightly lengthened to two seconds or the like. In other words, there is no need for the times for automatic screen switching to all be the same, and different times may be set for each of the screens.

Although in the first exemplary embodiment as described above, processing for a case in which there is a recursive transaction content present at S104 has been explained with reference to the screen diagrams of FIGS. 6A, 6B, FIGS. 7A, 7B, and FIGS. 8A, 8B, a different display and operation to these screen diagrams may be employed. For example, the emphasized display as explained in the second exemplary embodiment may be utilized. In cases in which a change reserve payout is searched as the recursive transaction at S104, the menu screen of FIG. 4A may be displayed instead of displaying the screen of FIG. 7A, and the operator may be guided so as to readily select "change reserve payout" by emphasizing the display of "change reserve payout". In the payout class selection screen of FIG. 4B, in a case in which the transaction content searched for is "specified denomination counts payout", the "specified denomination counts payout" may be displayed with emphasis so as to guide the operator. In the denomination counts input screen of FIG. 5A, input of the operator may be guided by surrounding locations for inputting unit numbers. In this way, in cases in which there is a transaction having the same transaction content repeatedly executed in the past, the input of the operator may be guided by emphasized display of the same transaction with the same transaction content already stored.

Although explanation has been given in the first exemplary embodiment and the second exemplary embodiment of the transaction processing device 1 serving as the information processing device, there is no limitation thereto, and application may be made to an information search device, an information providing device, or the like. Furthermore, although the transaction and transaction content has been explained as recursive processing in the transaction processing device 1, there is no limitation thereto, and processing and processing content executed in the information processing device may also be included.

What is claimed is:

1. An information processing device comprising:
an operation display;
a storage section configured to store transaction content information including a transaction content that has been previously executed and date/time information of the executed transaction content; and
a processor that is configured to:
based on an operation date/time information of a user operating the operation display, search in the storage section as to whether there is a recursive transaction that has been repeatedly executed with a same transaction content in a same time band as a time band of the operation date/time information; and
in a case in which there is the recursive transaction, display a first screen including a selection button for selecting the recursive transaction on the operation display and, after the selection button is selected, automatically switch displays of a plurality of screens showing a transaction content of the recursive transaction, wherein
the plurality of screens includes a final screen that is displayed at last, the final screen including a confirmation button to confirm the transaction content, and
after the confirmation button is selected, the processor is configured to perform processing based on the transaction content of the recursive transaction.

2. The information processing device of claim 1, wherein the processor is configured to switch the displays of the plurality of screens on the operation display according to a transaction sequence of the recursive transaction.

3. The information processing device of claim 1, wherein the plurality of screens comprise one or more operation buttons for operating a switching operation of the screens.

4. The information processing device of claim 1, wherein the plurality of screens comprise a second screen and a third screen, and
the processor is configured to switch the displays of the second screen and the third screen on the operation display according to a transaction sequence of the recursive transaction.

5. The information processing device of claim 4, wherein each of the second screen and the third screen comprises at least one of a stop button to stop automatic transition of the screens, a pause button to temporarily pause switching operations of the screens, or a skip button to skip the screens to a final screen.

6. The information processing device of claim 1, wherein the selection button is displayed with emphasis.

7. The information processing device of claim 3, wherein the one or more operation buttons are displayed with emphasis.

8. The information processing device of claim 1, wherein the processor is configured to search for the recursive transaction in the transaction content information including the transaction content, in a search range set by a specific search condition.

9. The information processing device of claim 8, wherein the processor is configured to search for the recursive transaction in the transaction content information including the transaction content, in a range of a same day of the week in past as the operation date/time information.

10. He information processing device of claim 8, wherein the processor is configured to search for the recursive transaction in the transaction content information including the transaction content, in a range of few days in past from the operation date/time information.

11. The information processing device of claim 8, wherein:
the transaction content information is associated with a cash register identification number and a user identification number; and
the processor is configured to search for the recursive transaction in the transaction content information based on the specified cash register identification number or the user identification number.

12. The information processing device of claim 1, wherein the processor is configured to display, on the first screen, a menu button to transition to a fourth screen for selecting a transaction class.

13. An information processing device, comprising:
an operation display;
a storage section configured to store transaction content information including a transaction content that has been previously executed and date/time information of the executed transaction content; and a processor that is configured to:
   based on an operation date/time information of a user operating the operation display, search in the storage section as to whether there is a recursive transaction that has been repeatedly executed with a same transaction content in a same time band as a time band of the operation date/time information; and
   in a case in which there is the recursive transaction, display a first screen including a selection button for selecting the recursive transaction on the operation display and, after the selection button is selected, automatically switch displays of a plurality of screens showing a transaction content of the recursive transaction, wherein the processor is configured to display another screen for setting search conditions for searching the recursive transaction on the operation display.

* * * * *